(12) United States Patent
Yoon et al.

(10) Patent No.: US 7,331,723 B2
(45) Date of Patent: Feb. 19, 2008

(54) ENHANCED COPLANAR WAVEGUIDE AND OPTICAL COMMUNICATION MODULE USING THE SAME

(75) Inventors: Ho Gyeong Yoon, Seoul (KR); Kwang Seong Choi, Seoul (KR); Yong Hwan Kwon, Daejeon (KR); Joong Seon Choe, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 62 days.

(21) Appl. No.: 11/486,493

(22) Filed: Jul. 14, 2006

(65) Prior Publication Data

US 2007/0133933 A1 Jun. 14, 2007

(30) Foreign Application Priority Data

Dec. 12, 2005 (KR) ...................... 10-2005-0121443

(51) Int. Cl.
*G02B 6/36* (2006.01)
*H01P 1/02* (2006.01)
(52) U.S. Cl. ........................................ 385/92; 333/249
(58) Field of Classification Search ............ 385/88–94; 333/249
See application file for complete search history.

(56) References Cited

U.S. PATENT DOCUMENTS 6,642,819 B1 11/2003 Jain et al.

2003/0202800 A1 10/2003 Matsushima et al.
2007/0063783 A1* 3/2007 Kanno et al. .................. 333/4

FOREIGN PATENT DOCUMENTS

| JP | 64-060008 | 3/1989 |
| JP | 2000-114801 | 4/2000 |
| JP | 2003-289206 | 10/2003 |

* cited by examiner

*Primary Examiner*—Sarah Song
(74) *Attorney, Agent, or Firm*—Ladas & Parry LLP

(57) ABSTRACT

Provided are an enhanced structure of a coplanar waveguide that is a kind of transmission line used for optical communication for radio frequency (RF), and an optical communication module employing the same. While having a basic structure including a conductive strip and ground strips at both sides of the conductive strip on a dielectric substrate, the coplanar waveguide has the structure in which metal patterns of a portion of the conductive strip located around points where an RF propagation direction is changed and of a portion of an inside ground strip are removed to make electrical lengths of an outside ground strip and the inside ground strip similar each other. Using the coplanar waveguide, it is possible to fabricate an optical module that has an optimized RF characteristic and also can freely change an RF propagation direction of several tens GHz, without an additional process.

11 Claims, 6 Drawing Sheets

ENHANCED COPLANAR WAVEGUIDE AND OPTICAL COMMUNICATION MODULE USING THE SAME

CROSS-REFERENCE TO RELATED APPLICATION

This application claims priority to and the benefit of Korean Patent Application No. 2005-121443, filed on Dec. 12, 2005, the disclosure of which is incorporated herein by reference in its entirety.

BACKGROUND

1. Field of the Invention

The present invention relates to a coplanar waveguide that can be applied to a high-speed optical communication module using a high radio frequency, and more particularly, to a coplanar waveguide that can change the propagation direction of a high-speed frequency signal at several tens GHz or more with a minimum loss and an optical communication module using the coplanar waveguide.

2. Discussion of Related Art

In recent years, as communication traffic increases, a high-speed radio frequency (RF) signal needs to be efficiently transmitted with a minimum loss. In some cases, a propagation direction of RF needs to be changed to 90° or another angle. In particular, in fabricating a module for optical communication, the RF propagation direction needs to be changed so that the RF direction becomes parallel to a light direction.

A coplanar waveguide is a transmission line that is generally used to efficiently transmit a high frequency at a very high speed. A method with a chamfered corner of a metal pattern of a coplanar waveguide in order to change the propagation direction of RF traveling along the coplanar waveguide on the same plane is disclosed in U.S. Patent Laid-Open Publication No. 2003/0202800A1.

In the U.S. patent publication, metal patterns 1, 2 and 3 have a chamfered corner in order to change the RF propagation direction by 90°, as indicated by reference mark A in FIG. 7. Therefore, it is possible to compensate for excessive electrical capacitance created as the RF propagation direction is changed, and to efficiently transmit a high frequency signal at a frequency band of several GHz.

However, one simulation showed that the coplanar waveguide according to the U.S. patent publication cannot be used as a transmission line for 40 GHz or more optical communication because it has a too great reflection loss in the 40 GHz or more optical communication. The conventional art is limited to a frequency band of about 20 GHz, and thus cannot be applied to an optical communication module at a frequency band of 40 GHz that the present invention pertains to.

As another conventional art, there is a method for additionally attaching three-dimensional air bridges B and C to bent portions of a coplanar waveguide, as illustrated in FIG. 8. The conventional art additionally requires micro electro mechanical systems (MEMS) or processes such as electroplating, vacuum deposition, and the like in order to attach the air bridges in fabricating the coplanar waveguide. This makes it difficult to fabricate the coplanar waveguide and significantly increases a coplanar waveguide fabrication cost.

SUMMARY OF THE INVENTION

It is an object of the present invention to provide a coplanar wave guide that can freely change the propagation direction of a radio frequency (RF) at several tens GHz while minimizing a reflection loss and can be fabricated without an additional process, and an optical communication module using the coplanar waveguide.

One aspect of the present invention provides a coplanar waveguide comprising a dielectric substrate; a conductive strip that is supported by the dielectric substrate, and has a bent portion bent at an arbitrary angle and a first opening formed inside the bent portion; a first ground strip that is supported by the dielectric substrate, located inside the conductive strip and having a second opening formed opposite to the first opening; and a second ground strip that is supported by the dielectric substrate, and is located outside the conductive strip.

The bent portion bent at an arbitrary angle may have a structure for changing an RF traveling through the conductive strip at an arbitrary angle including 90°. The structure may include the first opening and the second opening each having a stair-shaped portion. In addition, the structure may include a plurality of sub-bent portions bent with several steps. In addition, the structure may include the first opening and the second opening each formed into a circular arc shape or a curved track shape.

In addition, the conductive strip may further comprise another bent portion bent in a direction opposite to a bending direction of the bent portion and a third opening formed inside the another bent portion, and the second ground strip may further include a fourth opening formed opposite to the third opening.

Another aspect of the present invention provides an optical communication module comprising a module package; an optical device mounted on the module package; and an RF transmission line transmitting an RF signal traveling from the inside or outside of the module package to the optical device, wherein the RF transmission line includes a coplanar waveguide according to the first aspect of the present invention.

The optical communication module may further comprise an optical amplifier that is connected with the optical device through the coplanar waveguide.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Figure 1:
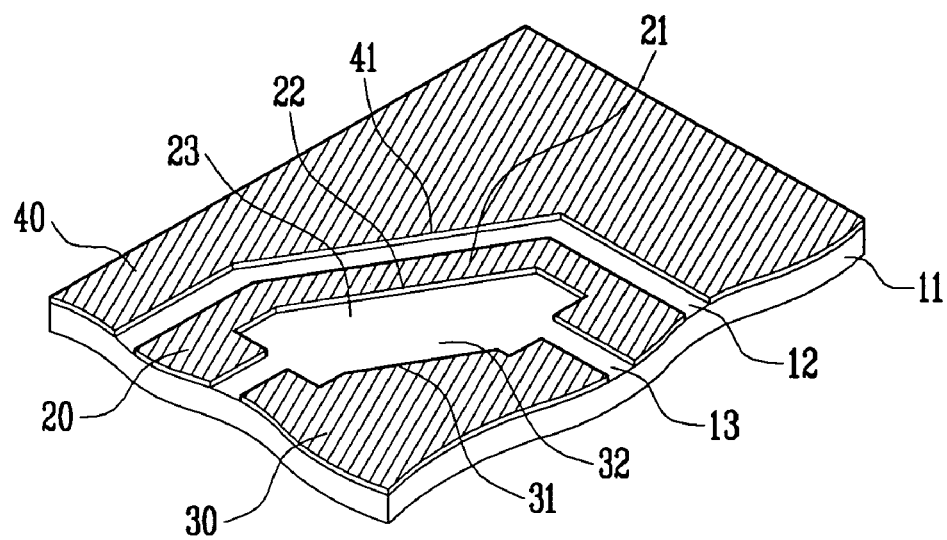
FIG. 1 is a perspective view of a coplanar waveguide according to an exemplary embodiment of the present invention.

Hereinafter, an exemplary embodiment of the present invention will be described in detail. However, the present invention is not limited to the embodiments disclosed below, but can be implemented in various types. Therefore, the present embodiment is provided for complete disclosure of the present invention and to fully inform the scope of the present invention to those ordinarily skilled in the art. Like elements are denoted by like reference numerals throughout the drawings. In addition, in the drawings, the thickness and size of each layer is exaggerated for the convenience and clarity of description. In following description, a radio frequency or high frequency is referred as an RF. Matters related to the present invention and well-known in the art will not be described in detail when deemed that such description would detract from the clarity and concision of the disclosure.

Figure 2:
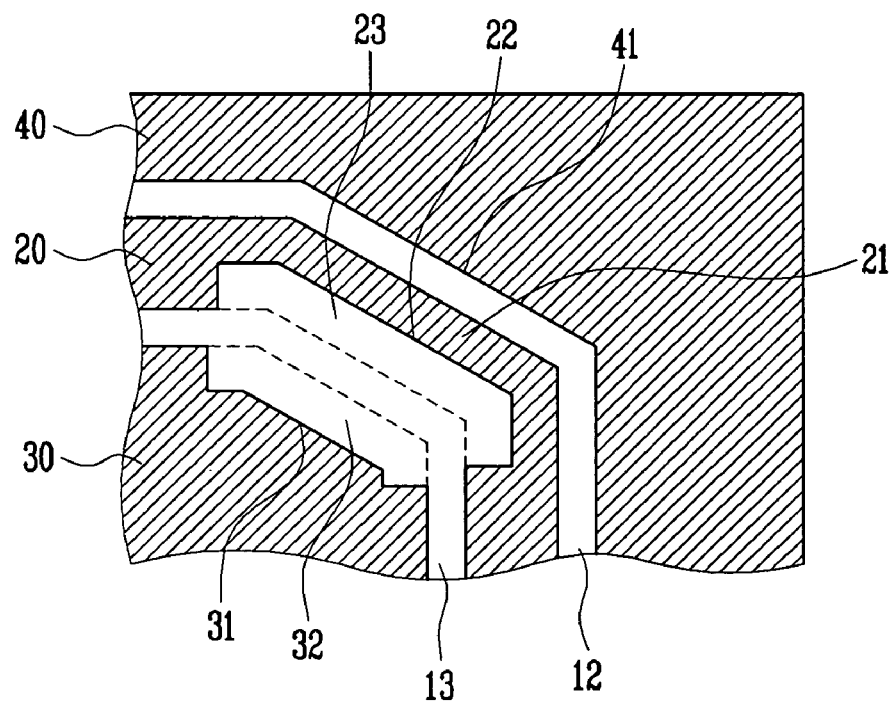
FIG. 2 is a plan view of the coplanar waveguide of FIG. 1.

FIG. 1 is a perspective view of a coplanar waveguide according to an exemplary embodiment of the present invention, and FIG. 2 is a plan view of the coplanar waveguide of FIG. 1.

Referring to FIGS. 1 and 2, the coplanar waveguide 10 according to the present invention is a kind of RF transmission line, and has a structure for changing the propagation direction of RF. To this end, the coplanar waveguide 10 comprises first and second ground strips 30 and 40 formed on edges of the upper surface of a dielectric substrate 11, and a conductive strip 20 located between the two ground strips 30 and 40 at predetermined distances 12 and 13 from the two ground strips 30 and 40.

As mentioned above, the coplanar waveguide 10 includes the ground strips 30 and 40 (also referred to as ground or ground line) formed on both edges of the upper surface of the dielectric substrate 11, and the conductive strip 20 (also referred to as signal line) formed in a center of the upper surface of the dielectric substrate 11, similarly to a typical coplanar waveguide. Unlike a typical coplanar waveguide, the ground strips 30 and 40 and the conductive strip 20 in the coplanar waveguide 10 according to the present invention are not bent at 90° or once but several times to an arbitrary angle. In addition, an inside portion of the signal line 20 located in a portion where the direction of RF is changed, and an outside portion of the ground line 30 located inside the signal line 20 among the two ground lines 30 and 40 are removed. In this embodiment, the removed portion 23 of the signal line 20 (also referred to as a first opening) and the removed portion 32 (also referred to as a second opening) of the ground line 30 located inside have similar shapes of playground slide, as illustrated in FIG. 2. In FIG. 2, dotted lines indicate the first and second openings 23 and 32 more clearly.

Here, the first ground line 30 in a bending direction of the signal line 20, when viewed from a bent portion 21 of the signal line 20 at an arbitrary angle including 90°, is defined to be inside the signal line 20, and the second opposite ground line 40 is defined to be outside the signal line 20. The inside portion of the signal line 20 refers to a portion in which a side 22 of the signal line 20 facing the first ground line 30 inside the bent portion 21 is located, and the outside portion of the first ground line 30 refers to a portion in which a side 31 of the first ground line 30 facing the inside side 22 of the signal line 20 is located.

As described above, the coplanar waveguide of the present invention is fabricated in a shape in which the two metal portions are removed from the bent portion 21 where the RF propagation direction is changed, i.e., to have the first and second openings 23 and 32, thereby compensating for a discrepancy between electrical lengths generated at the outside ground 40 and the inside ground 30. In addition, the portion (the first opening) of the inside portion of the signal line 20 is removed from the bent portion 21, thereby compensating for a discrepancy between electrical lengths at the inside portion 22 and the outside side (facing the second ground line) of the signal line 20. Thus, it is possible to obtain a transmission line having only a minimum reflection loss.

Figure 7:
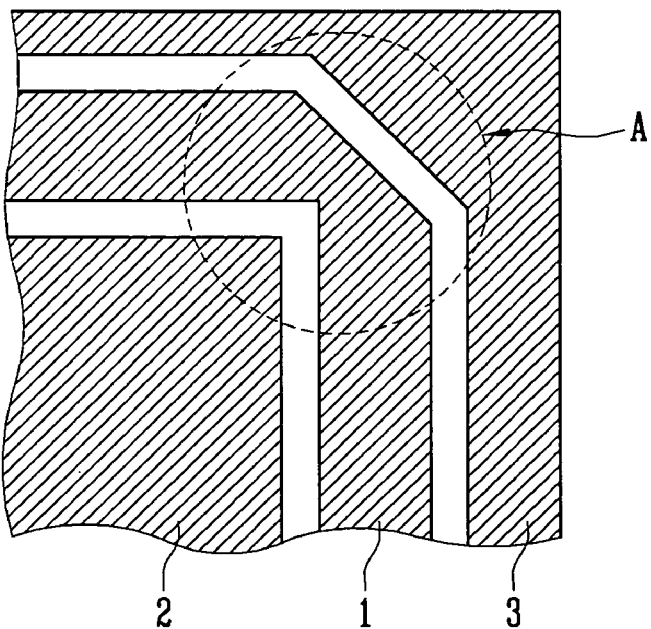
FIG. 7 is a plan view showing a conventional coplanar waveguide for changing the propagation direction of a radio frequency (RF)
Figure 8:
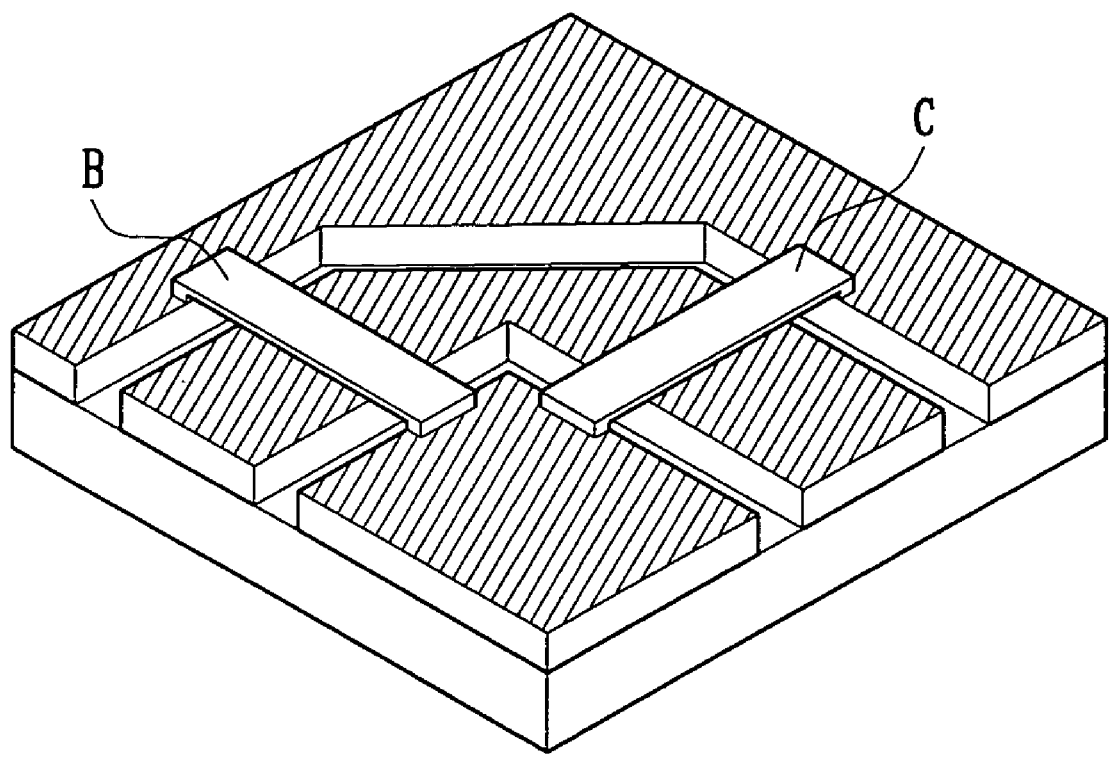
FIG. 8 is a perspective view showing another conventional coplanar waveguide for changing an RF propagation direction.

In brief, while the two above-mentioned ground strips and the conductive strip in the conventional coplanar waveguide having a straight, unchanged RF propagation direction need not be bent, some of optical communication modules having optical elements and RF elements may need a changed RF propagation direction. However, if two ground strips and one conductive strip are simply changed only in direction with no correction in order to change the RF propagation direction, electrical lengths differ and excessive capacitance are created upon RF propagation. This causes a great reflection loss and makes efficient RF transmission impossible. In order to solve such problems, efforts have been made conventionally. An example includes a method in which a corner of a conductive strip 1 or the corner of the conductive strip 1 and a corner of an outside ground strip 3 are formed in a cut-off shape, as indicated by reference numeral A in FIG. 7. It was confirmed that a coplanar waveguide according to this method has a great reflection loss in a frequency band between 20 GHz and several tens GHz that the present invention pertains to, and thus cannot efficiently transmit an RF. Another example includes a method of installing air bridges B and C adjacent to portions where a coplanar waveguide is bent, as illustrated in FIG. 8. The coplanar waveguide according to this method additionally requires a complex process such as micro electro mechanical systems (MEMS), vacuum deposition, etc. in order to three-dimensionally install the air bridges B and C on a conductive strip and ground strips, and thus causes increase of the production cost and significant reduction of yield. On the other hand, the coplanar waveguide according to the present invention is fabricated into a structure in which the inside metal portion of the conductive strip and the outside metal portion of the inside ground strip are removed and the direction of the strips are changed several times. Therefore, it is possible to simply fabricate a coplanar waveguide without an additional process and to perform RF transmission with ease at an RF of several tens GHz, so that a coplanar waveguide having optimized performance can be provided.

FIGS. 3A to 3D are plan views showing metal patterns having bent portions in coplanar waveguides according to other exemplary embodiments of the present invention. Various coplanar waveguides that can be modified without departing from the technical spirit of the present invention will now be described.

Figure 3A:
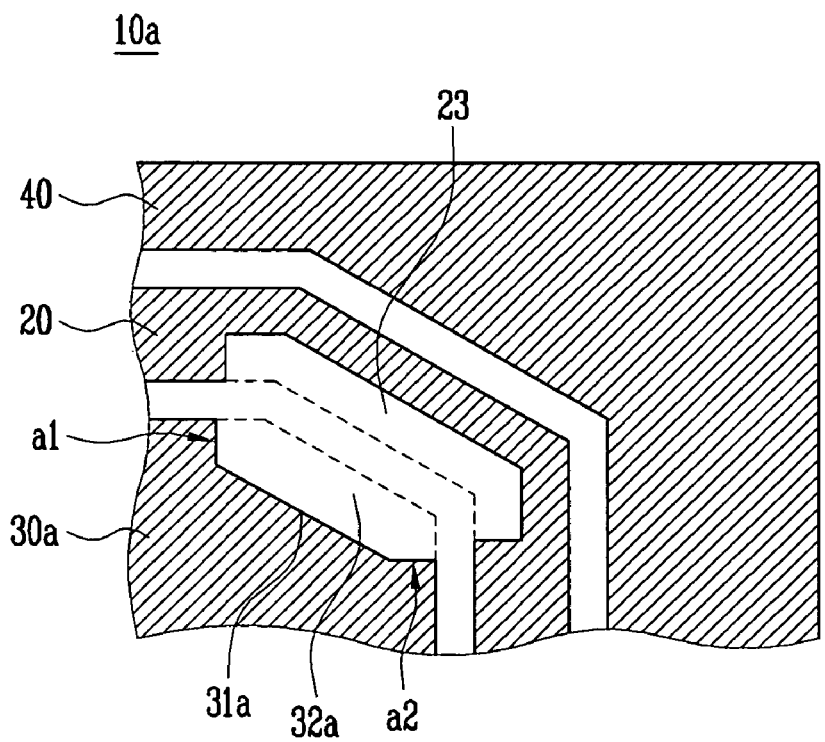
FIGS. 3A to 3D are plan views showing metal patterns having bent portions in coplanar waveguides according to other exemplary embodiments of the present invention.

In a coplanar waveguide 10a according to a first variant of the present invention, cut-off sides a1 and a2 of an inside ground strip 30a are directly connected with another side 31a of the inside ground strip 30a at discontinuous points existing in an RF propagation direction, as illustrated in FIG. 3A. In other words, compared to the coplanar waveguide 10 shown in FIG. 2, the coplanar waveguide 10a has a first opening 23 of a conductive strip 20 that has the same slide shape, but a second opening 32a of the inside ground strip 30a that has a polygon shape different from the slide shape.

Figure 3B:
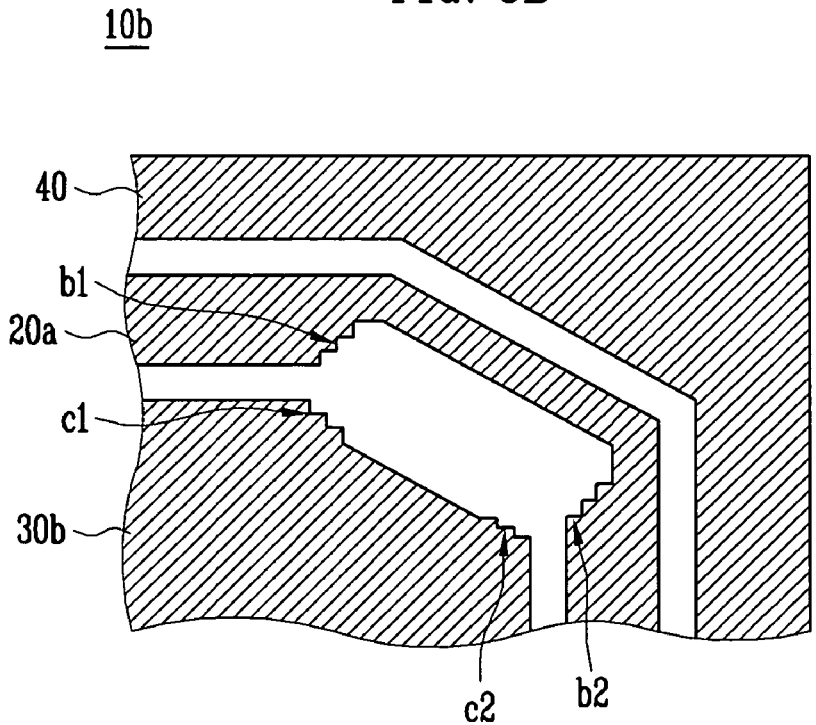

In a coplanar waveguide 10b according to a second variant, a conductive strip 20a has removed portions b1 and b2 in a stair shape, not in a straight line shape and an inside ground strip 30b has removed portions c1 and c2 in a stair shape in order to minimize discontinuous portions existing in an RF propagation direction, as illustrated in FIG. 3B.

Figure 3C:
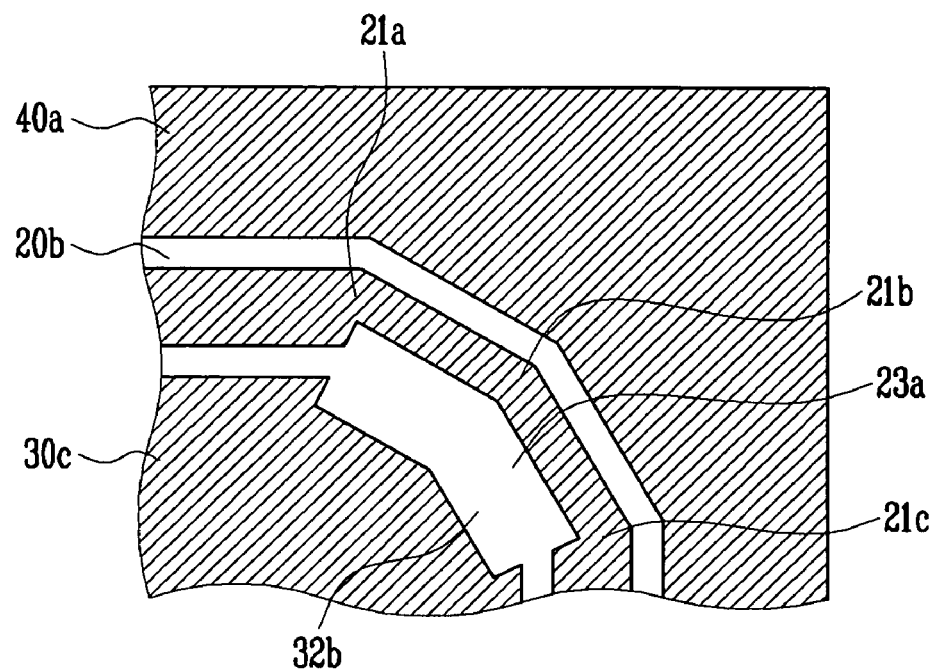

A coplanar waveguide 10c according to a third variant includes portions 21a, 21b and 21c obtained by changing an RF propagation direction three times at bent portions of a conductive strip 20b extending across ground strips 30c and 40a, as illustrated in FIG. 3C. Of course, the coplanar waveguide 10c comprises a first opening 23a in an inside side of the conductive strip 20b and a second opening 32b corresponding to the first opening 23a in the inside ground strip 30c. The coplanar waveguide 10c has more direction change portions than the coplanar waveguide 10 shown in FIG. 2, and thus exhibits a more excellent reflection property.

Figure 3D:
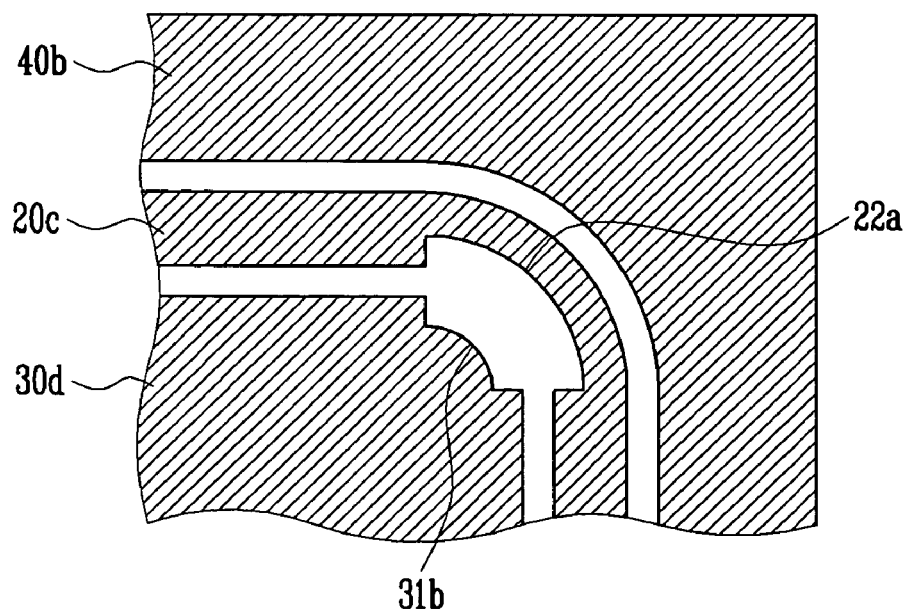

In a coplanar waveguide 10d according to a fourth variant, an inside side 22a of a conductive strip 20c and an outside side 31b of an inside ground strip 30d are formed in a curved track shape, not in a straight line shape, at a bent portion of the conductive strip 20c extending across the ground strips 30d and 40b, as illustrated in FIG. 3D.

Figure 4:
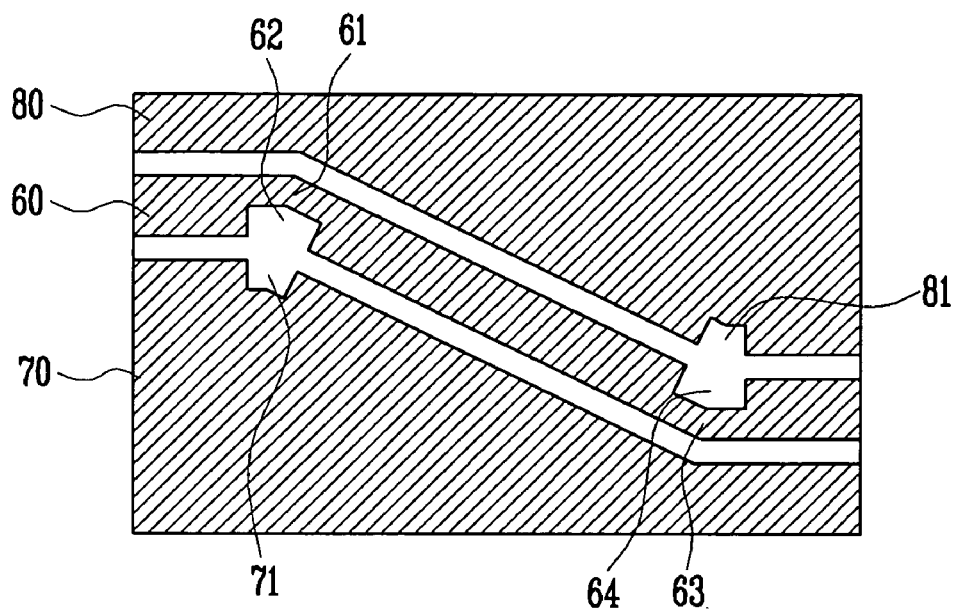
FIG. 4 is a plan view of a coplanar waveguide according to yet another exemplary embodiment of the present invention.

FIG. 4 is a plan view of a coplanar waveguide according to yet another exemplary embodiment of the present invention.

FIG. 4 shows another coplanar waveguide 50 according to the present invention. In fabricating a module by packaging an optical device, position change to an x-axis or a y-axis is occasionally needed at an RF input position and an RF output position for various reasons. Like this, even when the RF transmission direction should be changed to an arbitrary angle other than 90°, it is possible to transmit the RF with a minimum loss by using the coplanar waveguide 50 according to this embodiment.

The coplanar waveguide 50 comprises first and third openings 62 and 64 in which a portion of an inside side of a conductive strip 60 extending across ground strips 70 and 80 is removed more than other portions, and second and fourth openings 71 and 81 in which a portion of an outside side of the ground strips 70 and 80 located inside the respective bent portions 61 and 63 is removed, when viewed from the respective bent portions 61 and 63 at the first and second bent portions 61 and 63 of the conductive strip 60. Here, the second bent portion 63 is bent in a direction opposite to a bending direction of the first bent portion 61. For example, the first bent portion 61 is bent down toward the first ground strip 70, and the second bent portion 63 is bent up toward the second ground strip 80, as shown in FIG. 4.

Figure 5:
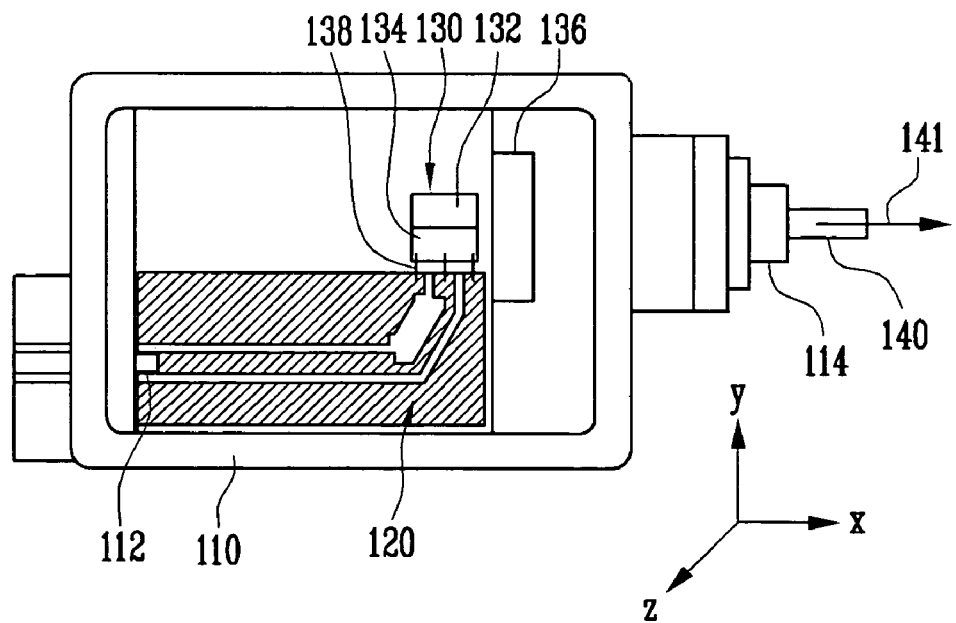
FIG. 5 is a constitution diagram schematically illustrating an optical communication module using a coplanar waveguide of the present invention.

FIG. 5 is a constitution diagram schematically illustrating an optical communication module using a coplanar waveguide of the present invention.

Referring to FIG. 5, the optical communication module has a typical structure using one optical device 130. It can be seen that the propagation direction 141 of an RF and light is the same as a positive x-axis direction by using the coplanar waveguide of the present invention.

Specifically, the optical communication module 100 according to this embodiment comprises a module package 110, a transmission line 120 and an optical device 130. The transmission line 120 includes the above-described coplanar waveguide of the present invention.

The optical device 130 includes an electric light device (laser diode) 134 formed on a substrate 132, and is connected to one end of the transmission line 120 through a bonding wire 138. The module package 110 is a body in which the optical device 130 and the transmission line 120 are mounted. It refracts light emitted from the electric light device 134 through a lens 136 and transmits the light to an optical fiber 140 that is coupled to the housing through a connector 114.

The transmission line 120 is implemented by the coplanar waveguide as described above with reference to FIGS. 1 to 4. Preferably, it is implemented by the coplanar waveguide as illustrated in FIGS. 1 and 2. Using the structure described above, the transmission line 120 transmits an RF, which is received through a microstrip line 112, to the optical device 130 through a coplanar waveguide extending in the same direction as the propagation direction 141 of light.

Figure 6:
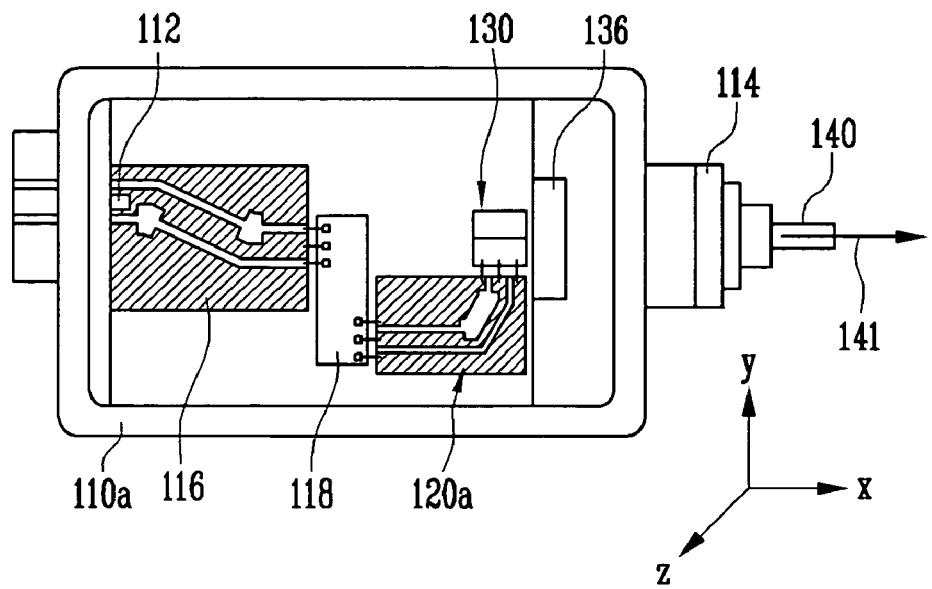
FIG. 6 is a constitution diagram schematically illustrating another optical communication module using a coplanar waveguide of the present invention.

FIG. 6 is a constitution diagram schematically illustrating another optical communication module using a coplanar waveguide of the present invention.

Referring to FIG. 6, the optical communication module 100a according to this embodiment has an advanced form, and is fabricated by integrating not only a module package 110a, a first transmission lie 120a and an optical device 130, but also other devices such as a second transmission line 116, an optical amplifier 118, and the like. The optical communication module 100a changes an RF propagation direction by implementing the first transmission line 116 and the second transmission line 120a using the coplanar waveguide according to the present invention, similarly to the optical communication module 100 of FIG. 5. Thus, it is possible to obtain the directions of the RF and the light in a positive x-axis, and to flexibly cope with a change in an RF propagation direction to an arbitrary angle.

As described above, when the coplanar waveguide according to the present invention is applied to optical communication module fabrication, it is possible to minimize a reflection loss and freely change a propagation direction on a plane, while an RF of several tens GHz travels. In addition, a coplanar waveguide having an enhanced structure can be obtained that can be fabricated without an additional process. Furthermore, an optical communication module can be easily fabricated that can make the propagation direction of a high-speed electrical signal having a frequency of several tens GHz or more parallel to a light signal.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A coplanar waveguide comprising:
   a dielectric substrate;
   a conductive strip supported by the dielectric substrate and having a bent portion bent at an arbitrary angle and a first opening formed inside the bent portion;
   a first ground strip supported by the dielectric substrate, located inside the conductive strip and having a second opening formed opposite to the first opening; and a second ground strip supported by the dielectric substrate and located outside the conductive strip.

2. The coplanar waveguide of claim 1, wherein the bent portion bent at an arbitrary angle has a structure for changing a radio frequency (RF) traveling through the conductive strip at an arbitrary angle including 90°.

3. The coplanar waveguide of claim 2, wherein the structure comprises the first opening and the second opening each having a stair-shaped portion.

4. The coplanar waveguide of claim 2, wherein the structure comprises a plurality of sub-bent portions bent with several steps.

5. The coplanar waveguide of claim 2, wherein the structure comprises the first opening and the second opening each formed into a circular arc shape or a curved track shape.

6. The coplanar waveguide according to claim 1, wherein the conductive strip has another bent portion bent in a direction opposite to a bending direction of the bent portion and a third opening formed inside the another bent portion, and the second ground strip has a fourth opening formed opposite to the third opening.

7. An optical communication module comprising:
a module package;
an optical device mounted on the module package; and
a radio frequency (RF) transmission line transmitting an RF signal traveling from the inside or outside of the module package to the optical device,
wherein the RF transmission line has a coplanar waveguide including:

a dielectric substrate;
a conductive strip supported by the dielectric substrate and having a bent portion bent at an arbitrary angle and a first opening formed inside the bent portion;
a first ground strip supported by the dielectric substrate, located inside the conductive strip and having a second opening formed opposite to the first opening; and
a second ground strip supported by the dielectric substrate and located outside the conductive strip.

8. The optical communication module of claim 7, wherein the bent portion of the coplanar waveguide bent at an arbitrary angle has a structure for changing a radio frequency traveling through the conductive strip at an arbitrary angle including 90°.

9. The optical communication module of claim 7, wherein the conductive strip of the coplanar waveguide comprises another bent portion bent in a direction opposite to a bending direction of the bent portion, and a third opening formed inside the another bent portion, and the second ground strip has a fourth opening formed opposite to the third opening.

10. The optical communication module according to claim 7, further comprising an optical amplifier connected with the optical device through the coplanar waveguide.

11. The optical communication module according to claim 7, wherein the optical device emits light traveling in the same direction as an RF signal traveling along the RF transmission line.

* * * * *